(12) United States Patent
Conway

(10) Patent No.: US 7,062,610 B2
(45) Date of Patent: Jun. 13, 2006

(54) METHOD AND APPARATUS FOR REDUCING OVERHEAD IN A DATA PROCESSING SYSTEM WITH A CACHE

(75) Inventor: Patrick Conway, Los Altos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 407 days.

(21) Appl. No.: 10/261,642

(22) Filed: Sep. 30, 2002

(65) Prior Publication Data

US 2004/0064651 A1    Apr. 1, 2004

(51) Int. Cl.
    *G06F 12/00* (2006.01)
(52) U.S. Cl. .................................... 711/141
(58) Field of Classification Search ............ 711/118, 711/133, 141, 145, 146; 345/543; 709/236; 710/29
    See application file for complete search history.

(56) References Cited

U.S. PATENT DOCUMENTS

| | | | |
|---|---|---|---|
| 4,197,580 A | 4/1980 | Chang et al. | |
| 5,375,216 A | 12/1994 | Moyer et al. | |
| 5,535,116 A | 7/1996 | Gupta et al. | |
| 5,553,265 A | 9/1996 | Abato et al. | |
| 5,680,576 A | 10/1997 | Laudon | |
| 5,727,150 A | 3/1998 | Laudon et al. | |
| 5,829,028 A | 10/1998 | Lynch et al. | |
| 6,101,574 A | 8/2000 | Kumasawa et al. | |
| 6,212,568 B1 * | 4/2001 | Miller et al. | 709/236 |
| 6,223,258 B1 * | 4/2001 | Palanca et al. | 711/138 |
| 6,442,666 B1 * | 8/2002 | Stracovsky | 711/206 |
| 6,490,654 B1 * | 12/2002 | Wickeraad et al. | 711/133 |
| 6,502,171 B1 * | 12/2002 | Arimilli et al. | 711/146 |
| 6,549,961 B1 * | 4/2003 | Kloth | 710/36 |
| 6,751,684 B1 * | 6/2004 | Owen et al. | 710/29 |
| 6,823,429 B1 | 11/2004 | Olnowich | |
| 6,839,816 B1 | 1/2005 | Borkenhagen et al. | |

(Continued)

FOREIGN PATENT DOCUMENTS

EP    0468786 A2    7/1991

(Continued)

OTHER PUBLICATIONS

Hpertransport Technology Consortium; HyperTransport I/O Link Specification, Revision 1.03; Oct. 10, 2001; pp. 17-21.*

(Continued)

*Primary Examiner*—Pierre M. Vital
(74) *Attorney, Agent, or Firm*—Larson Newman Abel Polansky & White, LLP

(57) ABSTRACT

A data processor (120) recognizes a special data processing operation in which data will be stored in a cache (124) for one use only. The data processor (120) allocates a memory location to at least one cache line of the cache (124). A data producer such as a data communication driver program running on a central processing unit (122) then writes a data element to the allocated memory location. A data consumer (160) reads the data element by sending a READ ONCE request to a host bridge (130). The host bridge (130) provides the READ ONCE request to a memory controller (126), which reads the data from the cache (124) and de-allocates the at least one cache line without performing a writeback from the cache to a main memory (170). In one form the memory controller (126) de-allocates the at least one cache line by issuing a probe marking the next state of the associated cache line as invalid.

20 Claims, 4 Drawing Sheets

U.S. PATENT DOCUMENTS

| | | | |
|---|---|---|---|
| 2002/0087796 A1* | 7/2002 | Fanning | 711/133 |
| 2003/0154350 A1 | 8/2003 | Edirisooriya et al. | |
| 2003/0163649 A1 | 8/2003 | Kapur et al. | |
| 2004/0019704 A1 | 1/2004 | Sano et al. | |
| 2004/0034747 A1 | 2/2004 | Rowlands et al. | |
| 2004/0128450 A1 | 7/2004 | Edirisooriya et al. | |

FOREIGN PATENT DOCUMENTS

| | | |
|---|---|---|
| EP | 0838762 A2 | 2/1993 |

OTHER PUBLICATIONS

Andrew "bunnie" Huang; Keeping Secrets in Hardware: the Microsoft XBox Case Study; May 26, 2002.*

"Next Generation Packet Processing: RM9000x2 Integrated Multiprocessor with Hypertransport," Rob Reiner, Platform Conference, PMC-Sierra, Jan. 23-24, 2002, pp. 1-17.

HyperTransport I/O Link Specification, Revision 1.03, HyperTransport Technology Consortium, Oct. 10, 2001, Chapter 3, p. 26-28.

"Cache-Coherent Distributed Shared Memory: Perspectives on Its Development and Future Challenges," John Hennessy et al., Proceedings of the IEEE, vol. 87, No. 3, Mar. 1999, pp. 418-429.

"The Computer Science and Engineering Handbook," Allen B. Tucker et al., 1997, CRC Press, p. 436-438.

"Multiprocessor Cache Coherency: MOESI Model Describes Snooping Protocol," Microprocessor Report, M. Thorson, Jun. 20, 1990, v4, n11, p. 12(4).

"An Evaluation of Directory Schemes for Cache Coherence," Anant Agarwal et al., Computer Systems Laboratory, Stanford University, IEEE, 1998, pp. 280-289.

U.S. Appl. No. 10/353,216, filed Jan. 27, 2003 (1458-TT5347).

"Cache Coherence Protocols: Evaluation Using a Multiprocessor Simulation Model," Acm Transactions on Computer Systems, Association for Computing Machinery, New York, vol. 4, No. 4, Nov. 1, 1966, ISSN:0734-2071, p. 281, line 21—p. 282, line 21.

* cited by examiner

| Bit-Time | 7 | 6 | 5 | 4 | 3 | 2 | 1 | 0 |
|---|---|---|---|---|---|---|---|---|
| 0 | SeqID[3:2] | | SeqID[1:0] | | Cmd[5:0] | | | |
| 1 | PassPW | | | | UnitID[4:0] | | | |
| 2 | COMMAND-SPECIFIC | | | | | | | |
| 3 | COMMAND-SPECIFIC | | | | | | | |
| 4 | Addr[15:8] | | | | | | | |
| 5 | Addr[23:16] | | | | | | | |
| 6 | Addr[31:24] | | | | | | | |
| 7 | Addr[39:32] | | | | | | | |

METHOD AND APPARATUS FOR REDUCING OVERHEAD IN A DATA PROCESSING SYSTEM WITH A CACHE

TECHNICAL FIELD

The present invention generally relates to data processing systems, and more specifically to data processing systems with caches.

BACKGROUND ART

A known way to increase the performance of a computer system is to include a local, high-speed memory known as a cache. A cache increases system performance because there is a high probability that once the central processing unit (CPU) accesses a data element at a particular address, its next access will be to an adjacent address. The cache fetches and stores data that is located adjacent to the requested piece of data from a slower, main memory or lower-level cache. In very high performance computer systems, several caches may be placed in a hierarchy. The cache that is closest to the CPU, known as the upper-level or "L1" cache, is the highest-level cache in the hierarchy and is generally the fastest. Other, generally slower caches are then placed in descending order in the hierarchy starting with the "L2" cache, etc., until the lowest level cache that is connected to main memory.

A cache follows certain policies when storing and discarding data. For example, many processors follow an "allocate-on-write" policy that dictates that the cache line corresponding to memory locations that are written by the CPU will be stored in the cache. Typically caches follow a policy known as least-recently-used (LRU) to determine which location to discard to make room for a new data element once all locations have been filled.

Caches typically contain multiple status bits to indicate the status of the cache line to maintain data coherency throughout the system. One common coherency protocol is known as the "MOESI" protocol. According to this protocol each cache line includes status bits to indicate which MOESI state the line is in, including bits that indicate that the cache line has been modified (M), that the cache line is exclusive (E) or shared (S), or that the cache line is invalid (I). The Owned (O) state indicates that the line is modified in one cache, that there may be shared copies in other caches and that the data in memory is stale.

In a typical configuration all caches are combined with the CPU in the same integrated circuit and main memory is located off-chip. Main memory is the slowest and least expensive memory in the system and may be constructed of inexpensive but relatively slow dynamic random access memory (DRAM) chips. This characteristic results in bottlenecks in accessing the off-chip DRAM main memory and it is desirable to avoid these bottlenecks whenever possible. Furthermore in recent years microprocessor speeds have increased faster than DRAM access speeds, compounding the bottleneck problem.

SUMMARY OF THE INVENTION

In accordance with the present invention, a method is provided for reducing overhead in a data processing system that includes a cache and a lower-level memory system. A memory location is first allocated to at least one cache line of the cache. A data producer writes a data element to the at least one cache line. A read once request is received from a data consumer. In response thereto, the data element is provided to the data consumer by reading the data element directly from the cache. The cache line is subsequently de-allocated without accessing the lower-level memory system.

In one form the invention comprises a data processor having a central processing unit including a cache, a host bridge, and a memory controller. The host bridge is coupled to the central processing unit and is adapted to receive a read once request for a data element from a data consumer. The memory controller has an input coupled to the host bridge and has an output coupled to the central processing unit. The memory controller issues a probe for the data element to the central processing unit in response to receiving the read once request. The probe indicates that a next state of at least one cache line containing the requested data element will be invalid. If the cache contains the data element, the central processing unit provides the data element to the host bridge and the cache marks the at least one cache line thereof invalid.

BRIEF DESCRIPTION OF THE DRAWINGS

The present invention will hereinafter be described in conjunction with the appended drawing figures, wherein like numerals denote like elements, and:

FIG. 4 illustrates an encoding table of a HyperTransport packet that can be used to form a READ ONCE request packet.

DETAILED DESCRIPTION OF THE DRAWINGS

Figure 1:
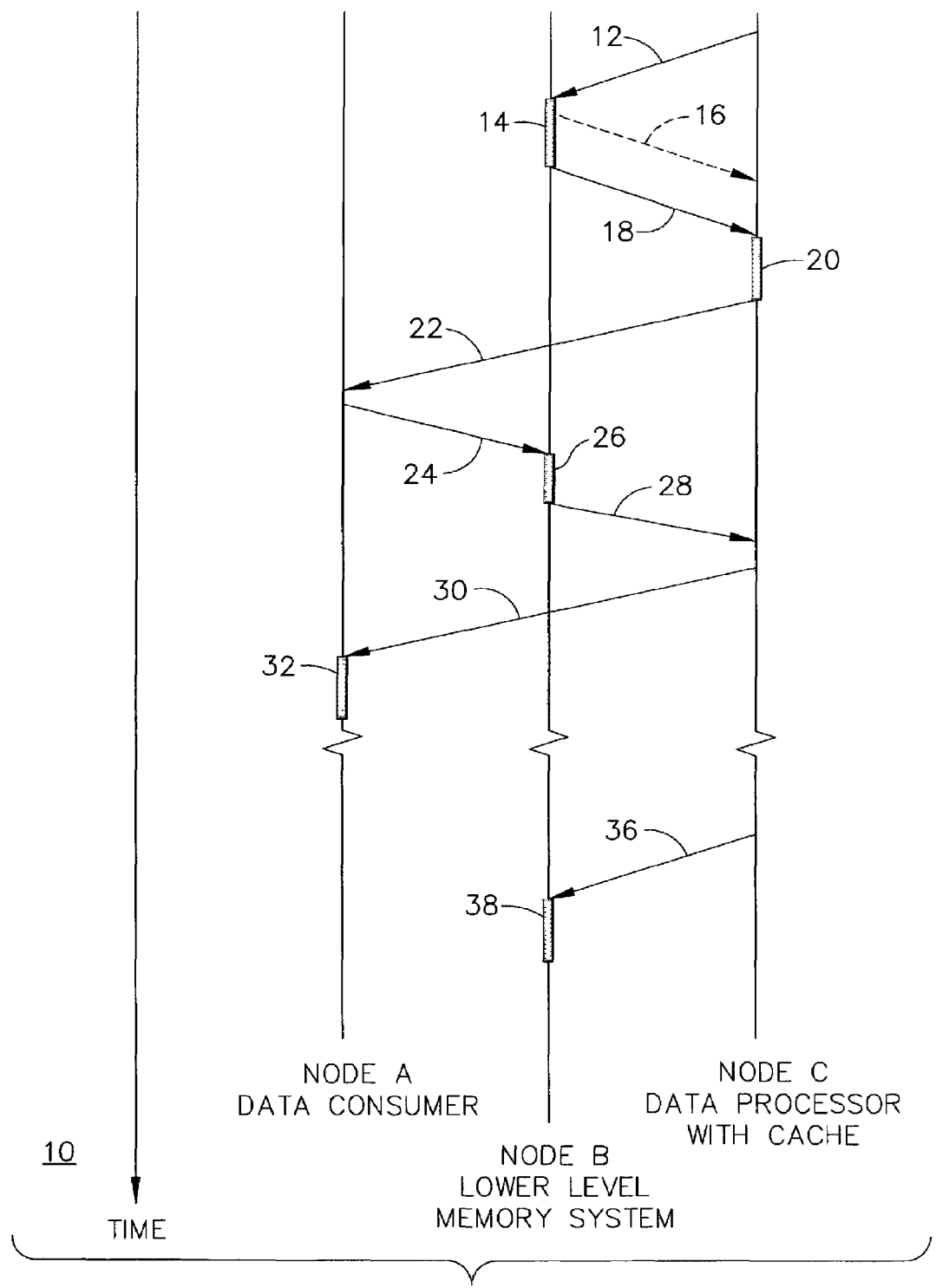
FIG. 1 illustrates a timing diagram associated with the flow of data and control signals in a data processing system known in the prior art.

FIG. 1 illustrates a timing diagram 10 associated with the flow of data and control signals in a data processing system known in the prior art. As shown in FIG. 1 the vertical axis represents time in which time flows from top to bottom. FIG. 1 depicts three devices (nodes) as vertical lines distributed along the horizontal direction. A first node, labeled "NODE A", is a data consumer. For example, NODE A may correspond to an input/output device such as a transmitter of a data communications channel. For this example NODE A may have an associated direct memory access (DMA) controller to assist the flow of data. A second node, labeled "NODE B", is a lower-level memory system and includes main memory and possibly one or more lower-level caches. A third node labeled "NODE C" is a data producer having a cache, such as a central processing unit running an application program. In the data communications context, NODE C would produce data in the form of data frames using a circular buffer system in memory for eventual transmission by a data communication device coupled to NODE A.

The flow of data and control signals will now be described. First an application program running on NODE C, such as a communication protocol driver, creates a data frame. NODE C writes the data for the data frame by performing a store operation to a memory location. Since the address has not been allocated to its local cache, NODE C initiates a store request to main memory represented by an arrow 12. The memory controller at NODE B initiates a memory access during a time 14 and sends an invalidating probe 16 to all caches including NODE C. The invalidating probe informs all caches in the system that the memory controller intends to allocate the cache line in exclusive state to NODE C for coherency purposes. When the data is returned from the lower-level memory system the memory controller forwards it to the data processor's cache on NODE C as shown by an arrow 18. The processor then writes the data into the cache line during time period 20. This type of operation is a conventional allocate-on-write operation.

After the cache write is complete the application program on NODE C signals the creation of the data frame through a notification message 22 from NODE C to NODE A. NODE A responds with a DMA read request 24 back to NODE B. Node B initiates a memory access during a time 26 and sends a probe 28 to NODE C. Since this data is present in the cache at NODE C, the data processor returns the data to satisfy this request as shown by arrow 30. The data consumer at NODE A then writes the data to the communication channel's transmission first-in, first-out (FIFO) memory, transmit buffer, or the like during time period 32.

Later after the passage of an indeterminate amount of time based on other events in the system, the modified cache line stored in the cache at NODE C becomes the least-recently-used cache line and will be cast out. NODE C thus performs a writeback by sending the modified data to the lower-level memory system at NODE B shown as arrow 36. The memory controller at NODE B writes the data to the lower-level memory system during a time period 38.

Note that this conventional operation requires one read and one write to main memory and thus occupies the main memory bus during the time periods 14 and 38. For a system implementing a high-bandwidth communication protocol this operation would be repeated frequently, consuming a significant portion of the available bandwidth. In recent years main memory speeds have increased but not as fast as processor speeds and a reduction in the main memory bus bandwidth required for this operation would be desirable.

Figure 2:
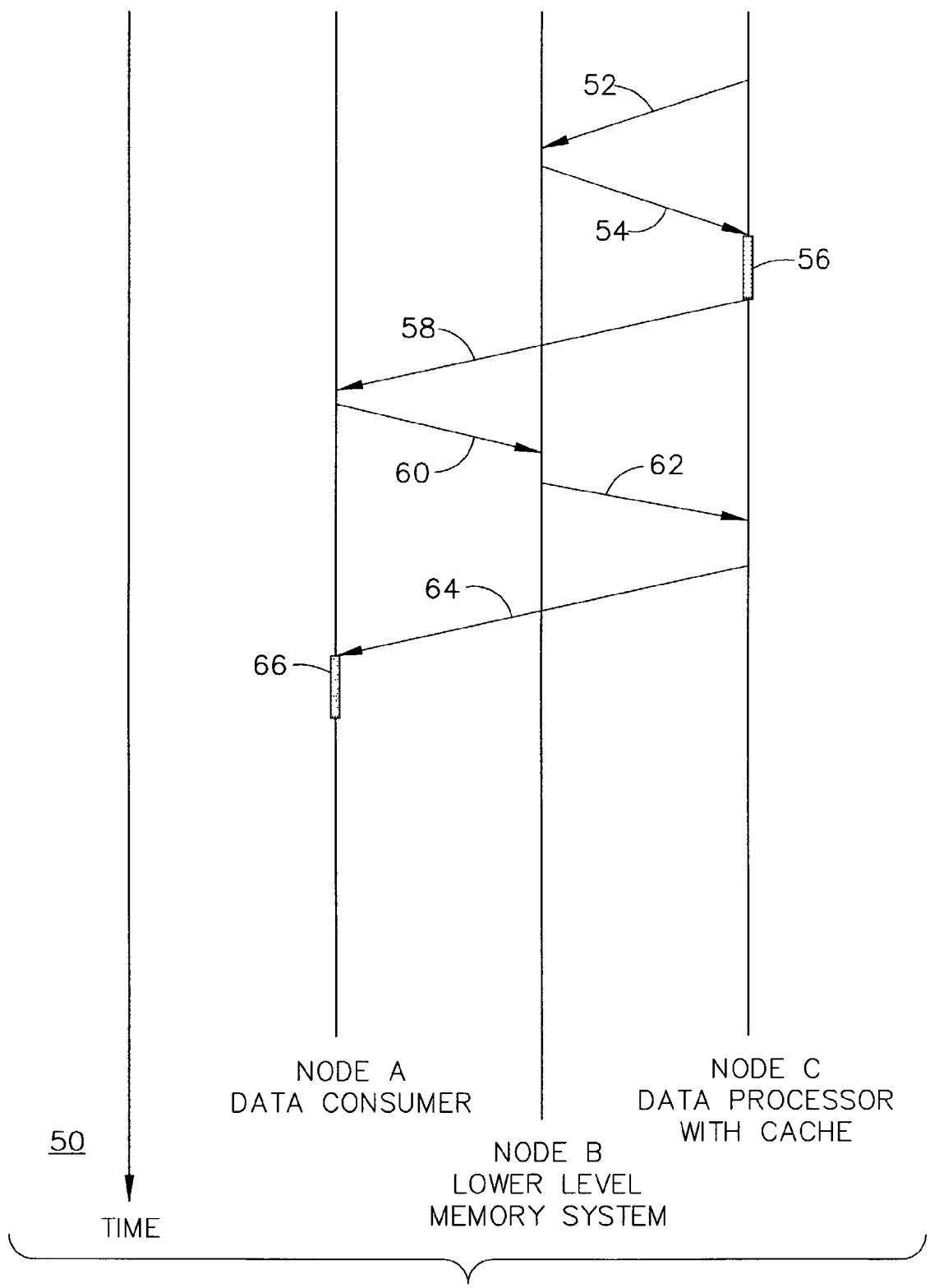
FIG. 2 illustrates a timing diagram associated with the flow of data and control signals according to the present invention.

To decrease main memory bandwidth the inventor realized that the communication operation is a special case in which the data can be operated upon solely within the processor's cache, avoiding the need for any access to main memory at all. Moreover since the data is to be used only once, the subsequent writeback is not needed. In order to avoid the writeback the inventor has devised a method and a corresponding data processing system to signal such a condition and prevent the writeback from occurring. It can also be implemented with a general-purpose cache that responds to invalidating probes without adding to the number of cache line states. Such a method can be understood with reference to FIG. 2, which illustrates a timing diagram 50 associated with the flow of data and control signals according to the present invention. As with respect to FIG. 1, the vertical axis represents time in which time flows from top to bottom, and the horizontal axis depicts the same three nodes described above.

The operation commences with a request 52 between the CPU and the memory controller known as a "PREFETCH ALLOCATE". This special cache control instruction causes the cache line to be allocated to the cache within NODE C without first reading the contents of that memory location from DRAM. The contents of the line are set to all zeros and the line is created in the M state. The memory controller updates its directory and responds with a target done signal 54. Then the data processor's driver program writes the data directly into the cache to construct the frame during a time period 56. Once the application program has constructed the frame, it sends a notify message 58 to the DMA controller in the input/output device at NODE A. The I/O device responds with a DMA read request 60 to NODE B. Node B initiates a memory access and sends a probe 62 to NODE C. Node C satisfies the read request by providing the data as indicated by an arrow 64. NODE A then writes the data to its internal FIFO or transmit buffer during time period 66 for subsequent transmission. When NODE A reads the data, the cache at NODE C de-allocates the cache line without the writeback that would normally be required. This operation allows the data processing system to avoid all accesses to the lower-level memory system by using the PREFETCH ALLOCATE instruction and removing (de-allocating) the data from the cache concurrently with the read.

There are at least three ways to de-allocate the cache line without writing back its contents to main memory. First the I/O controller at NODE A could add a READ ONCE attribute signal to indicate that the cache line is to be invalidated without being written back. Second the CPU at NODE C could decode the I/O address for the DMA read request and if the read falls within a predefined address window, invalidate the line. Third, the data processor's instruction set could be modified to add a "CFLUSH DEAL-LOCATE" command to de-allocate a single cache line. As described more fully below, the inventor prefers the first technique to take advantage of some available characteristics of the on-chip I/O controllers. This technique and an apparatus that implements it will now be more fully described with reference to FIGS. 3 and 4 below.

Figure 3:
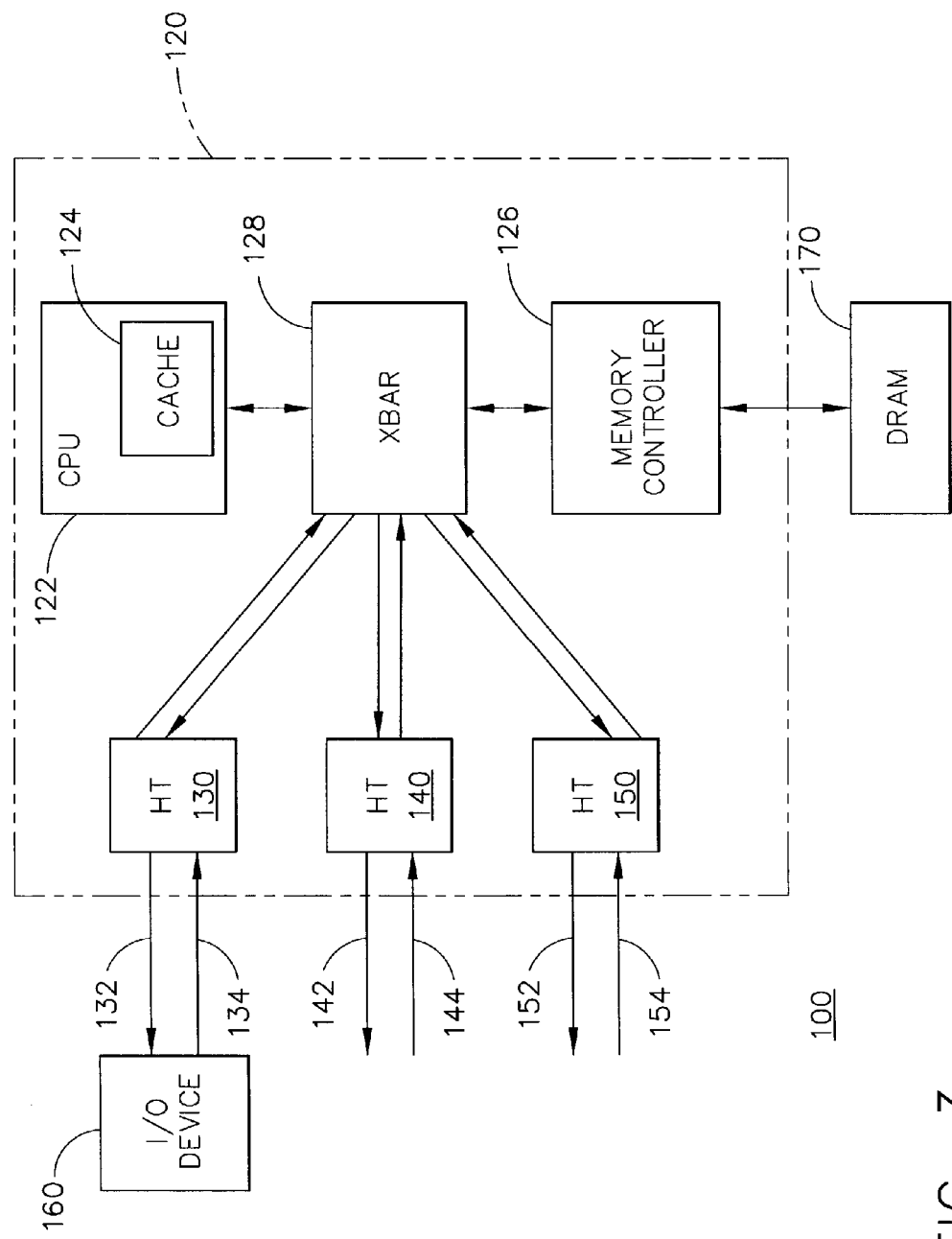
FIG. 3 illustrates a block diagram of a data processing system according to the present invention.

FIG. 3 illustrates a block diagram of a data processing system 100 according to the present invention. Data processing system 100 includes generally a data processor in the form of a single-chip microprocessor 120, an input/output (I/O) device 160, and a dynamic random access memory (DRAM) 170. Microprocessor 120 includes generally a central processing unit (CPU) 122, a memory controller 126, a crossbar switch labeled "XBAR" 128, and three host bridges 130, 140, and 150 each labeled "HT" for HyperTransport, described more fully below. CPU 122 is a processor adapted to execute instructions of the so-called x86 instruction set. The x86 instruction set is based on the instruction set of the 8086 microprocessor first manufactured by Intel Corporation of Santa Clara, Calif. CPU 122 however includes many sophisticated functions for high-performance execution of x86 programs including pipelining and superscalar design. CPU 122 includes at least one cache 124 for storage of frequently used data. In a preferred form CPU actually includes two L1 caches, one for instructions and the other one for data, and an L2 cache that is shared by the instruction and data streams. In this form the shared L2 cache stores the READ ONCE data. However the invention is applicable to any CPU having at least one cache.

Memory controller 126 is the mechanism for data transfer between microprocessor 120 and DRAM 170. Memory controller 126 offloads the task of initiating and terminating memory accesses from CPU 122. It includes internal queues to allow efficient use of the external bus to DRAM 170. In other embodiments DRAM 170 could be replaced by a lower-level memory system including one or more additional caches and main memory, by static RAM, by non-volatile memory, etc.

XBAR 128 is a switching/multiplexing circuit designed to couple together the buses internal to microprocessor 120.

Host bridges 130, 140, and 150 are coupled to devices external to microprocessor 120 over output channels 132, 142, and 152, respectively, and over input channels 134, 144, and 154, respectively. Each of host bridges 130, 140, and 150 comply with the HyperTransport™ I/O Link Specification, Revision 1.03, © 2001 HyperTransport Technology Consortium, and are able to achieve a throughput of 3.2 GB/sec when using a 1600 MHz data rate. HyperTransport technology is a packet-based link implemented on two independent unidirectional sets of wires. So for example host bridge 130 communicates with I/O device 160 over an output connection 132 and an input connection 134. The HyperTransport link is nominally point-to-point and connects two devices. Chains of HyperTransport links can also be used as an I/O channel, connecting I/O devices and bridges to a host system.

The HyperTransport link is designed to deliver a high-performance and scalable interconnect between CPU, memory, and I/O devices. The HyperTransport link uses low swing differential signaling with on-die differential termination to achieve very high data rates. The HyperTransport link uses scalable frequency and data width to achieve scalable bandwidth.

I/O device 160 is an input/output device that functions as a consumer of data. In the illustrated embodiment I/O device 160 is a controller that implements the local area network communication protocol standardized by the Institute of Electrical and Electronics Engineers (IEEE) under the auspices of the IEEE 802.3 committee, commonly referred to as "Ethernet". However the present invention is applicable to other data consumers as well.

In operation an application program running on CPU 122 prepares a frame for transmission and stores the frame in cache 124. As described above with respect to FIG. 2, CPU 122 first performs a PREFETCH ALLOCATE command so that the cache lines are allocated to cache 124 without the necessity of accessing DRAM 170. I/O device 160 accesses this data prior to sending it out on the external Ethernet bus. According to the HyperTransport standard, I/O device 160 can request this data element by sending a block read request packet over the HyperTransport link. HT block 130 receives the block read request and forwards it to memory controller 126 over XBAR 128. Memory controller 126 then probes the on-chip devices to determine whether they contain a valid copy of the requested data element. In this example cache 124 has a valid copy of this data. Cache 124 completes the access by forwarding the data to I/O device 160 through HT block 130.

In existing data processors cache 124 would follow a known policy such as the LRU replacement policy. At an appropriate time, when this data element becomes the least-recently-used data element and cache 124 needs to allocate a new cache line, cache 124 would write the data to DRAM 170 through memory controller 126. However in some circumstances such as the producer-consumer data communication example this data will be used only once by the system and the write to DRAM 170 would be superfluous. Thus according to the present invention I/O device 160 sends a new packet type known as a READ ONCE packet over HyperTransport input channel 134. The READ ONCE packet preferably uses a reserved encoding of the command (Cmd) field of the read request packet, not currently defined in the HyperTransport standard, to signal that its use of the requested data is for a READ ONCE purpose. The READ ONCE request allows microprocessor 120 to suppress the DRAM access that would normally be required on writeback, and thus conserves bandwidth on the main memory bus.

The mechanism for suppressing this future DRAM access will now be described in detail. In response to receiving this novel READ ONCE request, memory controller 126 issues probe with an indication that the next state of the cache line of any device having the requested data element will be invalid (I). Thus if it stores the data element, cache 124 will forward the requested data to memory controller 126 and mark invalid the cache line in which the data element is located. By marking the cache line containing the READ ONCE data as invalid, microprocessor 122 avoids the need to write the data back to DRAM 170 when a valid cache line is cast out of cache 124.

FIG. 4 illustrates a diagram of a HyperTransport packet 200 that can be used to form a READ ONCE request packet. This packet structure is known as the request packet with address. The packet is four bytes long with an additional four-byte address. According to the present invention I/O device 160 signals a READ ONCE request by inserting a new READ ONCE encoding into the command field as described further below.

The various fields associated with this packet will now be described. SeqID[3:0] (formed by concatenating bits 7 and 6 of Bit-time 0 with bits 6 and 5 of Bit-time 1) is used to tag groups of requests that were issued as part of an ordered sequence by a device and must be strongly ordered within a virtual channel. All requests within the same I/O stream and virtual channel that have matching nonzero SeqID fields must have their ordering maintained. The SeqID value of 0×0 is reserved to mean that a transaction is not part of a sequence. Transactions with this value have no sequence-ordering restrictions, although they may be ordered for other reasons as described in Chapter 6 of the HyperTransport standard.

The Cmd[5:0] field is used to signal various commands in the HyperTransport protocol. The 2001 HyperTransport standard defines various encodings of the Cmd[5:0] field, and reserves other encodings. TABLE I shows the defined and reserved encodings:

TABLE I

| Code | VChan | Command | Comments/Options | Packet Type |
|---|---|---|---|---|
| 000000 | — | NOP | Null packet. Contains flow control information. | Info |
| 000001 | | Reserved-HOST | | |
| 000010 | NPC | Flush | Flush posted writes | Request |
| 000011 | | Reserved-HOST | | |
| 0001xx | | | | |
| x01xxx | NPC or | Wr (sized) | Write request | Req/Addr/Data |
| x01xxx | PC (bit 5) | | [5] Defines whether request is posted: 0: Nonposted 1: Posted [2] Defines the data length: 0: Byte 1: Doubleword | |

TABLE I-continued

| Code | VChan | Command | Comments/Options | Packet Type |
|---|---|---|---|---|
| | | | [1] Defines bandwidth/latency requirements:<br>0: Normal<br>1: Isochronous<br>[0] Indicates whether access requires host cache coherence (ignored if access is not to host memory):<br>0: Noncoherent<br>1: Coherent | |
| 01xxxx<br>01xxxx | NPC | Rd (sized) | Read requests<br>[3] Defines ordering requirements for response:<br>0: Response may not pass posted requests<br>1: Response may pass posted requests<br>[2] Defines the data length:<br>0: Byte<br>1: Doubleword<br>[1] Defines bandwidth/latency requirements:<br>0: Normal<br>1: Isochronous<br>[0] Indicates whether access requires host cache coherence (ignored if access is not to host memory):<br>0: Noncoherent<br>1: Coherent | Req/Addr |
| 100xxx | | Reserved-I/O | | |
| 110000 | R | RdResponse | Read Response | Resp/Data |
| 110001 | | Reserved-HOST | | |
| 110010 | | | | |
| 110011 | R | TgtDone | Tell source of request that target is done. | Response |
| 11010x | | Reserved-HOST | | |
| 11010x | | Reserved-HOST | | |
| 11011x | | Reserved-I/O | | |
| 11100x | | Reserved-HOST | | |
| 11100x | | Reserved-HOST | | |
| 11100x | | Reserved-HOST | | |
| 111010 | PC | Broadcast | Broadcast message | Reg/Addr |
| 111011 | | Reserved-HOST | | |
| 111100 | PC | Fence | Fence posted requests | Request |
| 111101 | NPC | Atomic RMW | Atomic Read-Modify-Write | Req/Addr/Data |
| 111110 | | Reserved-I/O | | |
| 111111 | — | Sync/Error | Link Synchronization and Error Packet | Info |

PassPW indicates that that this packet is allowed to pass packets in the posted request channel of the same I/O stream. Otherwise, this packet must stay ordered behind them. This bit should be cleared to maintain the standard personal computer interface-(PCI-) like ordering model of Hyper-Transport technology. Systems that do not require PCI-like ordering may set PassPW for higher performance.

The UnitID[4:0] field serves to identify participants in a transaction. Since all packets are transferred either to or from the host bridge at the end of the fabric, either the source or destination node is implied. The value 0 is reserved for the UnitID of the host bridge. See Section 4.2 of the 2001 HyperTransport standard for more details on the use of UnitID. Nodes with multiple logical I/O streams can own multiple UnitID values.

The HyperTransport protocol reserves two bytes, transmitted during bit times 2 and 3, to be specific to the command.

Addr[39:2] represents the doubleword address accessed by the request. Not all address bits are included in all request types. Where finer granularity is required, byte masks are used.

I/O device 160 preferably signals the READ ONCE request by using any one of the Cmd[5:0] field definitions that are marked "Reserved-I/O". In addition, however, since there are very few reserved command encodings for I/O devices, the new READ ONCE packet is preferably combined with other new packet formats using only one Reserved-I/O command encoding. This objective is accomplished by using the four-bit SeqID field to encode additional conditions to differentiate the between the other new packet types.

It should be apparent that the foregoing discussion of the READ ONCE signaling is specific to the HyperTransport protocol. However in other embodiments of the present invention other methods of signaling the READ ONCE condition may be used. For example, special encodings of bits fields, existing or additional input/output pins and the like may be used to signal the READ ONCE condition. The READ ONCE signaling may be accomplished on other I/O buses, such as PCI, PCI-X, PCIE, by using reserved or vendor specific fields in the I/O DMA read request packet.

While the invention has been described in the context of a preferred embodiment, various modifications will be apparent to those skilled in the art. For example a data processing system using the disclosed method may be applicable to systems interfacing directly to main memory as well as to a lower-level cache. Furthermore the invention is applicable to systems with one or more higher-level caches. Main memory may be constructed using DRAM, SRAM, nonvolatile memory, or any other type of memory. Furthermore several methods of de-allocating the cache line after it has been read once are possible. Accordingly, it is intended by the appended claims to cover all modifications of the invention that fall within the true scope of the invention.

I claim:

1. In a data processing system having a memory hierarchy including a cache and a lower-level memory system, a method comprising the steps of:
    allocating a memory location to at least one cache line of the cache;
    writing a data element to said at least one cache line by a data producer; and
    receiving a read-once request for said data element from a data consumer, said data consumer indicating via said read once request that said at least one cache line is to be invalidated without being written back, and in response thereto providing said data element to said data consumer by reading said data element directly from the cache, and subsequently de-allocating said at least one cache line without accessing the lower-level memory system.

2. The method of claim 1 wherein said step of de-allocating comprises the step of marking said at least one cache line as invalid in response to said step of reading.

3. The method of claim 1 wherein said step of allocating comprises the step of allocating said memory location to at least one cache line of the cache without accessing the lower level memory system.

4. The method of claim 1 wherein said step of writing said data element comprises the step of writing at least a portion of a data communication frame.

5. The method of claim 1 wherein said step of writing comprises the step of writing said data element to said at least one cache line by an application program executing on a central processing unit.

6. A method for reducing overhead in a data processing system having a memory hierarchy including a cache and a lower-level memory system, comprising the steps of:
    receiving a read once request for a data element, said read once request indicating that at least one cache line of the cache is to be invalidated without being written back;
    probing for the presence of said data element in said at least one cache line of the cache;
    indicating in conjunction with said step of probing that a next state of said at least one cache line is to be invalid; and
    satisfying said read once request by either, providing data from said at least one cache line of the cache and subsequently invalidating said at least one cache line if said data element is stored in the cache, or fetching said data element from the lower-level memory system if said data element is not stored in the cache.

7. The method of claim 6 wherein said step of providing data from said at least one cache line comprises the steps of:
    initiating an access to the lower-level memory system; and
    subsequently aborting said access when said data element is found to be stored in the cache.

8. The method of claim 6 further comprising the step of producing data in said cache by an application program running on a central processing unit.

9. The method of claim 6 wherein said step of receiving said read-once request comprises the step of receiving said read-once request as an input to a microprocessor.

10. The method of claim 6 wherein said step of receiving said read-once request further comprises the step of receiving said read-once request using a link substantially compatible with the HyperTransport™ I/O Link Specification, Revision 1.03.

11. A data processor comprising:
    a central processing unit including a cache;
    a host bridge coupled to said central processing unit and adapted to receive a read once request for a data element from a data consumer, said data consumer indicating via said read once request that a cache line storing said data element is to be invalidated without being written back; and
    a memory controller having an input coupled to said host bridge and having an output coupled to said central processing unit, wherein said memory controller issues a probe for said data element to said central processing unit in response to receiving said read once request, said probe indicating a next state of at least one cache line containing said data element will be invalid;
    wherein if said cache contains said data element, said central processing unit provides said data element to said host bridge and said cache marks said at least one cache line invalid.

12. The data processor of claim 11 wherein said memory controller is adapted to couple to a lower-level memory system.

13. The data processor of claim 11 wherein said central processing unit, said host bridge, and said memory controller are coupled together by means of a crossbar switch.

14. The data processor of claim 11 wherein said host bridge is coupled to an input/output device using a link substantially compatible with the HyperTransport™ I/O Link Specification, Revision 1.03.

15. The data processor of claim 14 wherein said host bridge detects the read once request from a reserved command field encoding in a request packet.

16. The data processor of claim 11 wherein said central processing unit, said host bridge, and said memory controller are combined into a single integrated circuit.

17. A data processor comprising a central processing unit having a cache, a host bridge operatively coupled to said central processing unit and adapted to transfer data to and from an input/output device, and a memory controller operatively coupled to the central processing unit and to the host bridge which, responsive to read requests for a data element, probes internal devices for the presence of the data element in at least one cache line of the cache and selectively initiates accesses to a lower-level memory system, the improvement wherein:
    the host bridge is further adapted for receiving a read once request, said read once request indicating that the at least one cache line is to be invalidated without being written back, and in response to receiving the read once request signaling the memory controller to probe the internal devices for the presence of the data element while marking a next state of the at least one cache line as invalid.

18. The data processor of claim 17 wherein the central processing unit, memory controller, and host bridge are operatively coupled together using a crossbar circuit.

19. The data processor of claim 17 wherein the host bridge is coupled to an input/output device using a link substantially compatible with the HyperTransport™ I/O Link Specification, Revision 1.03.

20. The data processor of claim 19 wherein the host bridge detects the read once request from a reserved command field encoding in a request packet.

* * * * *